United States Patent
Barnsby et al.

[11] Patent Number: 5,685,797
[45] Date of Patent: Nov. 11, 1997

[54] COATED PLANET GEAR JOURNAL BEARING AND PROCESS OF MAKING SAME

[75] Inventors: Roger Michael Barnsby, Manchester; Albert Hunt McKibbin, Cromwell, both of Conn.; Rainer Werner Aufischer, Ohlsdorf, Austria

[73] Assignee: United Technologies Corporation, Hartford, Conn.

[21] Appl. No.: 442,619

[22] Filed: May 17, 1995

[51] Int. Cl.[6] .............................. B32B 15/01; B22F 7/04
[52] U.S. Cl. ........................ 475/331; 384/625; 384/912
[58] Field of Search ......................... 475/331; 384/492, 384/625, 912; 428/469

[56] References Cited

U.S. PATENT DOCUMENTS

| | | | |
|---|---|---|---|
| 1,770,582 | 7/1930 | Pike | 384/492 |
| 2,187,755 | 1/1940 | Ryder | 29/149.5 |
| 4,404,263 | 9/1983 | Hodes et al. | 428/564 |
| 4,481,047 | 11/1984 | Winfree et al. | 148/429 |
| 4,719,818 | 1/1988 | McCreary | 475/331 X |
| 4,803,933 | 2/1989 | Carey, Jr. et al. | 110/338 |
| 4,830,933 | 5/1989 | Hodes et al. | 204/192.15 |
| 4,832,809 | 5/1989 | Hodes et al. | 428/646 |
| 4,848,934 | 7/1989 | Blakely et al. | 384/206 |
| 4,856,367 | 8/1989 | Nemoto | 74/606 R |
| 4,889,772 | 12/1989 | Bergmann et al. | 428/547 |
| 4,904,362 | 2/1990 | Gaertner et al. | 204/192.12 |
| 4,946,747 | 8/1990 | Bergmann et al. | 384/912 |
| 4,961,831 | 10/1990 | Bergmann et al. | 74/606 R |
| 5,102,379 | 4/1992 | Pagluica et al. | 475/331 |
| 5,328,772 | 7/1994 | Tanaka et al. | 428/548 |
| 5,391,125 | 2/1995 | Turra et al. | 475/331 X |
| 5,518,820 | 5/1996 | Averbach et al. | 428/469 |

FOREIGN PATENT DOCUMENTS

| | | |
|---|---|---|
| 41623 | 1/1930 | Denmark. |
| 260524 | 9/1988 | Germany. |
| 60-135564 | 7/1985 | Japan. |
| 702272 | 1/1954 | United Kingdom. |

OTHER PUBLICATIONS

Metals Handbook, vol. 1, 1961, p. 849.

*Primary Examiner*—Khoi Q. Ta
*Attorney, Agent, or Firm*—John E. Boyd; Curtis, Morris & Safford, P.C.

[57] ABSTRACT

The production of a bearing surface by coating a known bearing material directly on the surface of a gear bore. A process of coating bearing materials directly onto the surface of a gear and the product thereof. The surface is preferably the inner bore surface of a planet gear. The coating methods include sputtering and vapor deposition. The bearing material applied as a coating is preferably a copper-lead composition. The resultant gear having a bearing coating can be useful in any high density, high efficiency epicyclic gear train for aircraft, marine or land based power transmissions.

24 Claims, 3 Drawing Sheets

COATED PLANET GEAR JOURNAL BEARING AND PROCESS OF MAKING SAME

FIELD OF THE INVENTION

The invention relates to planet gears having bearing materials coated directly onto the inner bore surface of the gears and methods for producing the same.

BACKGROUND OF THE INVENTION

Speed reducing planetary gear systems have been used for aircraft propulsion systems in either the dual output shaft mode, in which power is extracted from both the planet gear carrier and the ring gear, rotating in opposite directions, or the single output mode, in which either the ring gear or the planet carrier is fixed to the engine frame. In the class of high by-pass ratio aircraft gas turbine engines, the low pressure turbine shaft, rotating at high speed, typically directly drives the sun gear of a planetary gear system. This gear system includes a planet gear carrier supporting a plurality of planet gears and transferring power and load from the sun gear through the planet gears to one or both output shafts. High speeds and loads are imposed on this gear system, increasing with aircraft propulsion power requirements.

FIG. 1 illustrates a prior planetary gear system. The prior art planetary gear assembly 10 includes a ring gear 12 which is rigidly supported on support 14. Sun gear 16 is centrally located within the ring gear. Five planet gears 18 are arranged to mesh with the sun gear 16 and ring gear 12.

Each planet gear 18 has an outer gear section 20 with a bearing sleeve 22 fitted inside. The planet gear is supported on pin 24 which in turn is supported by the planet gear carrier 26.

Sun gear 16 is rotated in the direction 28 applying force 30 against the planet gear 18. This causes the planet gear to rotate in the direction of arrow 32 because of the force 34 imposed by the ring gear 12. The planet gears 18 and the planet gear carrier 26 move in the direction 36.

Centrifugal force imposes a G-force 38 on the planet gear. The combination of these forces results in a resultant force 40 transferred from the planet gear bearing 22 through a lubricating oil film to the pin 24, and thence to the carrier 26.

Previous gear systems employed steel-backed cast leaded bronze sleeves (item 22 in FIG. 1) installed in the planet gears with a very tight shrink fit. The sleeve 22 rotates around the pin 24. The cast leaded bronze bore of the sleeve acts as the journal bearing surface. Deflection of the pin, the carrier or the planet gear leads to distortion of the bearing surface and to localized variations in the bearing clearance. A balance is required between a minimum clearance and excessive clearance in order for the bearing to function properly. Too small a clearance results in excessive lubricant film temperature, and too large a clearance will result in inadequate from thickness.

It is known that flexibility of principal components of the gear system is necessary not only as a consequence of design and material selection for weight reduction, but also to contribute to load equalization between the various planet gears. However, flexibility of the planet gear must be carefully analyzed, since gear rim deflection not only modifies bearing clearance, but also disturbs the shrink fit between the bearing sleeve and the planet gear rim, potentially leading to wear at the shrink fit interface and failure due to mis-location of the bearing sleeve.

The load on the planet bearing which must be transferred through the pin to the carrier includes the sun gear force plus the ring gear force and the G-field centrifugal force due to planet gear mass. For a specified gear system outer diameter, a larger pin would stiffen the pin surface and lead to lower planet weight and also lower G-forces, but in turn increase planet distortion. It would also stiffen the carrier assembly and diminish load sharing capability between the various planet gears. A smaller diameter pin would facilitate load sharing but increases planet G-forces bending of the pin.

The prior art bearing sleeves have to be fabricated separately, assembled into the planet gear, retained mechanically with suitable features, and machine finished. These sleeves also add weight and cost to the prior art planetary gear systems. Furthermore, the separate steel backed bearing sleeve found in previous gear systems requires increasingly tighter shrink fit with the planet gear as gear distortion increases with increasing mesh loads, G-Forces and/or gear flexibility. The present invention overcomes these disadvantages by providing an integral one-piece construction of a planet gear having a bearing coating directly applied to the inner bore surface of the gear.

The following reference and those referred to hereinafter, which are each hereby incorporated by reference, disclose the state of the art.

U.S. Pat. No. 5,102,379 to Pagluica et at. discloses a planetary gear system which includes a plurality of planet gears, each having a journal bearing and a pin (see abstract). In Pagluica et at., the journal bearing must be fabricated separately, inserted into the planet gear and machine finished. This adds additional weight and costs, while reducing reliability.

OBJECTS OF THE INVENTION

It is therefore a primary object of this invention to provide a planet gear having an inner bore surface coated directly with a bearing material.

It is a further and related object of the invention to provide a planetary gear system comprising planet gears having an inner bore surface directly coated with a thin layer of bearing material.

It is a still further and related object of the invention to provide a method for directly coating the inner bore surface of a planet gear.

These and other objects of the invention will be readily apparent from the following description and claims.

SUMMARY OF THE INVENTION

The present invention combines gear and journal bearing mechanical elements into a single precision part produced by directly coating the inner bore of the gear with a bearing material. This invention eliminates the need for a bearing sleeve which has to be fabricated separately, assembled into the gear, retained mechanically with suitable features, and machine finished. This invention provides an integral one-piece construction for reduced weight and cost, increased load capacity and precision, which eliminates risk of failure of any mechanical retention features.

BRIEF DESCRIPTION OF THE DRAWINGS

The following detailed description, given by way of example but not intended to limit the invention solely to the specific embodiments described, may best be understood in conjunction with the accompanying drawings in which.

DESCRIPTION OF THE PREFERRED EMBODIMENT

Figure 1:
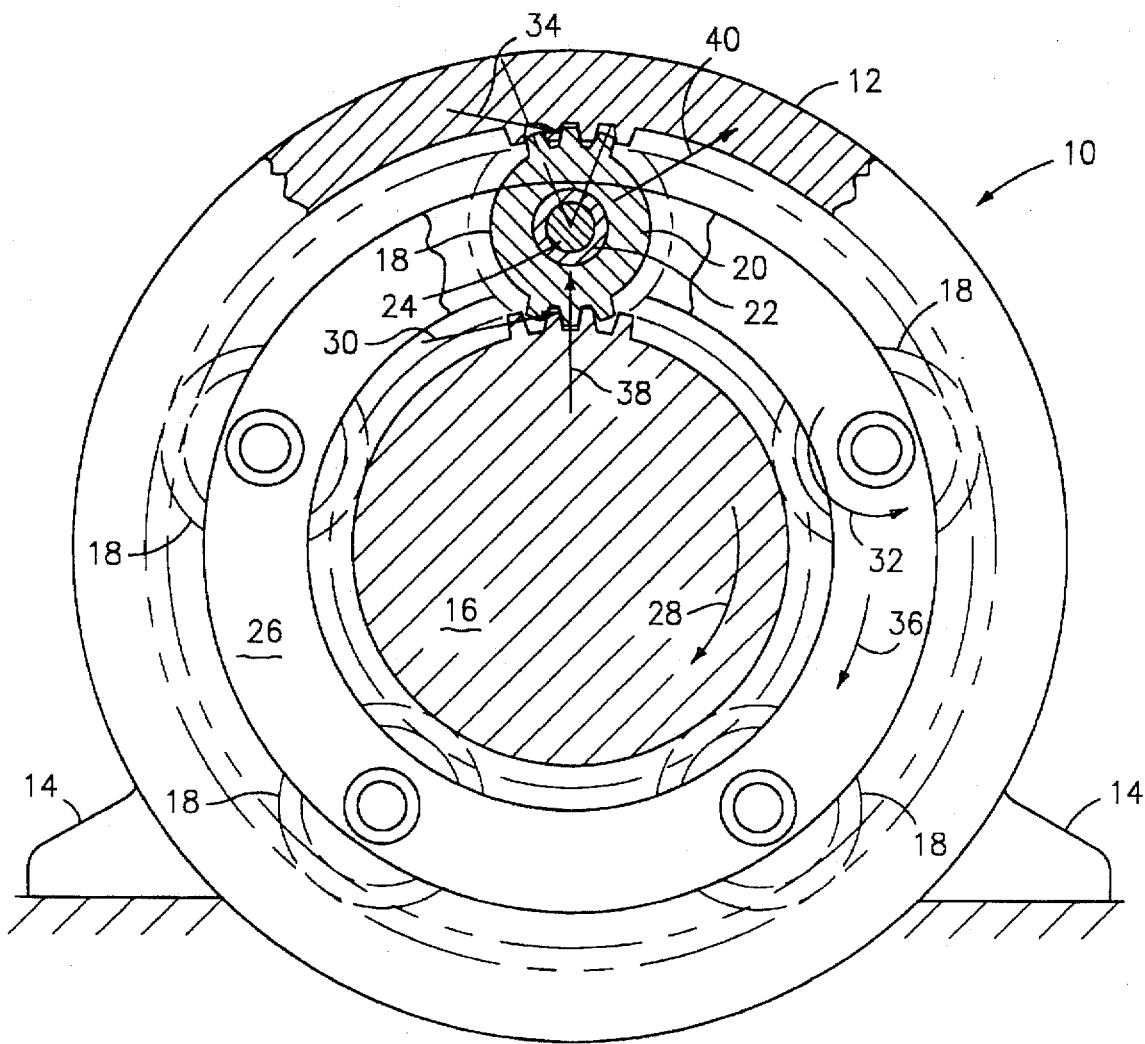
FIG. 1 illustrates a sectional view through a planetary gear assembly containing a prior art sleeve.

A planetary gear assembly generally contains a plurality of planet gears which are supported on a planet carrier and located between a sun gear and a ring gear. Each of the planet gears typically has the shape of a thick cylinder with teeth on the outer diameter thereof and a smooth inner bore surface. According to the present invention, within each planet gear, the inner bore surface is coated with a bearing material. The invention eliminates the use of a bearing sleeve which has to be fabricated separately, assembled into the gear bore, retained mechanically with suitable features and machine finished. Since such sleeves add weight without adding strength, elimination of the sleeves increases the strength to weight ratio of the planet gear. This invention provides an integral one-piece construction for reduced weight and cost, while at the same time increasing load capacity and precision. The invention eliminates the risk of failure of any mechanical retention feature (i.e., interference fit, key, spleen, shoulder, etc.). Testing has shown that the sputtered layer not only reduces size and weight, but also increases load capacity and reliability.

The coating material must be applied following elevated temperature heat treatment steps of the gear teeth, such as carburizing, hardening or tempering, since these processes are carried out at temperatures damaging or destructive to the bearing coating. The coating material, on the one hand, must be applied at temperatures low enough to avoid further tempering of the gear teeth.

Using a sputtering process for coating provides a finely dispersed mixture of material alloy elements whether or not such elements are readily combined using alternative coating methods.

The optimum sputtered layer is 0.0016 to 0.0040 inches, preferably only 0.0030 to 0.0032 inches thick. This is about one-tenth the thickness of the prior east leaded bronze layers used as sleeves. The thickness should be uniform within plus or minus 50 micro inches. The hardness of the bearing material should be about 120–170 Vickers, preferably 130–150. The surface finish should be about 10–50 micro-inches AA, preferably about 20 micro-inches. The preferred bearing material composition for the power gear application is a mixture of copper and lead, with a lead content between 20 and 30% by volume, preferably between 25 and 29%.

Surprising and unexpected results are achieved using the present invention. A p-v level (pressure x velocity) is a wear factor used for evaluating gear systems. The p-v level achieved using the planet gear coated with a bearing material according to the present invention is at least as high as a system using a bearing sleeve. The p-v level for the present invention is up to $17.7 \times 10^6$ PSI.FT/MIN. The discovery that a bearing coating can perform as well as a separate bearing sleeve is an unexpected result. This is especially true in view of the fact that the coating achieves this while at the same time reducing the weight of the gear system.

Moreover, the gear having a bearing coating in accordance with the teachings of the present invention achieves significantly lower Sommerfeld numbers. The Sommerfeld number is a nondimensional number used to characterize the performance of journal bearings. The Sommerfeld number is proportional to viscosity and speed and inversely proportional to load and clearance. For high loads and small bearing support areas, the unit load increases and lower Sommerfeld numbers are required. When the temperature of the planetary gear system increases during use, the viscosity decreases and lower Sommerfeld numbers are required. The present invention allows the gear system to operate at lower Sommerfeld number ranges than with the prior bearing sleeves down to about 0.0008.

Furthermore, the bearing coating can be refurbished with additional applications of the bearing material. The performance of refurbished bearings was found to be equivalent to that of new bearings.

The present invention, therefore, achieves surprising results with a reduction of weight and cost. The bearing coating eliminates the bearing sleeve, without sacrificing performance.

The Planetary Gear Assembly

The planet gear according to the present invention comprises a bearing material coated directly onto the inner bore surface. The planetary gear systems of the prior art include a plurality of planet gears, each having a journal bearing sleeve inserted into the gear bore and a pin. The present invention replaces the bearing sleeve with a coating which is applied directly to the inner surface of the planet gear.

Figure 2:
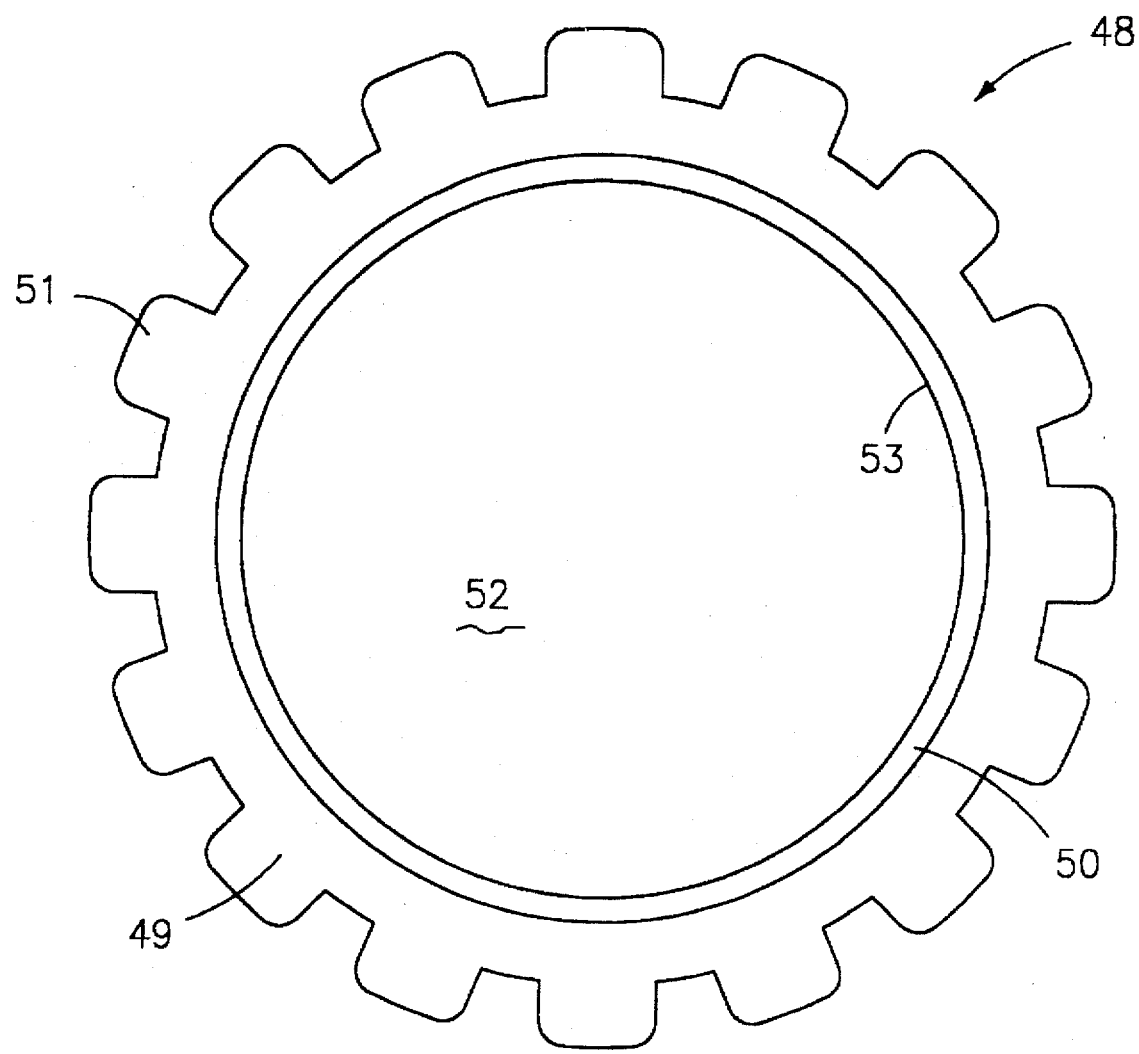
FIG. 2 illustrates an elevational view of a preferred embodiment of a planet gear in accordance with the teachings of the present invention.

Referring to FIG. 2, each planet gear 48 in accordance with the teachings of the present invention has a gear rim section 49 with a bearing material 50 coated onto the inner bore surface. Gear teeth 51 are located on the outer surface of the gear and the gear 48 is supported on pin 52. An oil film is located at the interface 53 of the bearing material 50 and the pin 52.

The coated gear is one of several disposed around a central externally toothed "sun" gear and a concentric internally toothed "ring" gear. Each planet gear meshes with both the sun and the ring gear. The subject gear (known as a "planet" or "star" gear) is positioned by and loaded against a radial or "journal" fluid film bearing. For adequate operation over required speed, load and power levels, the cylindrical inner surface of the gear (or outer boundary of the load carrying fluid film) is coated with a suitable wear resistant metallic layer of "bearing material". In this invention, a layer of bearing material of suitable thickness is applied directly to the inner surface of the gear.

Figure 3:
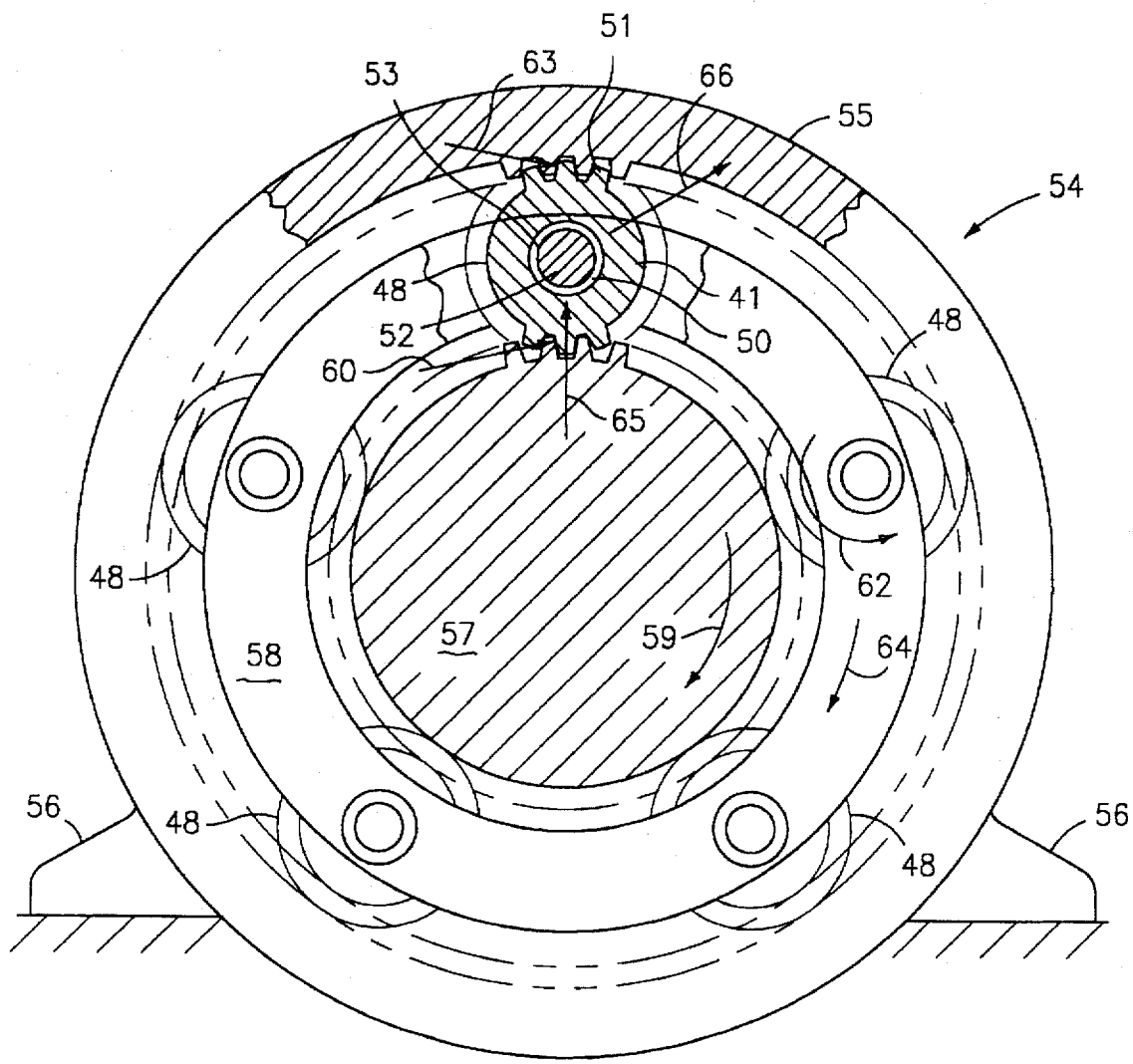
FIG. 3 illustrates a sectional view through a planetary gear assembly containing a plurality of the planet gears of FIG. 2.

An example construction and application of this device is shown in FIG. 3. A planetary gear assembly 54 includes a ring gear 55 which is rigidly supported on support 56. Sun gear 57 is centrally located within the ring gear 55. Five planet gears 48 are arranged to mesh with both the sun gear 57 and the ring gear 55.

Each planet gear 48 has a gear rim section 41 with bearing material 50 coated onto the inner bore surface thereof. The gear 48 is supported on pin 52 which in turn is then supported by the planet gear carrier 58. Gear teeth 51 are located between the sun gear and the planet gear 48. Planet bearing material 50 is coated within the internal circumference of the planet gear.

The sun gear 57 is rotated in the direction of arrow 59 which applies force 60 against the planet gear. This causes the planet gear 48 to rotate in the direction of arrow 62 because of a reacting force 63 imposed by the ring gear. The planet gears 48 and the planet gear carrier 58 thus move in the direction of arrow 64.

Centrifugal force imposes a G-force 65 on the planet gear. The combination of these forces results in a resultant force 66 transferred from the planet gear bearing coating 50 through a lubricating oil film to the pin 52, and thence to the carrier 58. The lubricating film of oil, supplied by pressure fed oil through holes in the pin, transfers load and prevents wear of the coating and pin surfaces.

The oil film is located at the interface 53 of the bearing coating and the pin 52. The pin geometry has been optimized in conjunction with the gear system flexibility and bearing clearance variations to insure a uniform pressure profile within the bearing oil film at the bearing/pin interface 53.

The Methods of Coating

The coating should be applied to the gear following all metallurgical processing (heat treatment) of the gear material to avoid damage to the coating. Furthermore, the coating application process should be accomplished at temperatures below those which might alter the metallurgy of the gear.

The coating methods that can be used to coat a bearing material on the surface of gear include: (1) sputtering or analogous thermal sublimation; (2) electron beam physical vapor deposition; or (3) plasma deposition, and combination of these processes. The development of technology relating to the coating of various materials has been escalating in recent years. Both the biomedical and electronics field have been involved in the technology because films have great utility in these areas.

A sputtering process which transfers atomic level particles of bearing alloy elements to the internal surface of the gear has been found effective. The sputtering process impinges high velocity electrons on a target comprising the material to be transferred to the bearing surface, releasing electrically charged ions of the target material elements. These ions are transferred and deposited through controlled voltage potential and temperature of the bearing surface. Both sputtering or analogous thermal sublimation systems take a compound and bombard it with ions which have been accelerated towards the coating material by a high radio frequency or direct current potential. The momentum of the impacting ions transfers energy to the solids surface atoms causing them to be ejected at high velocities onto a substrate surface.

U.S. Pat. No. 4,904,362 to Craertner et al., hereby incorporated by reference, discloses a sputtering process suitable for sputtering onto surfaces having curved areas such as the inner surfaces of hollow bodies. This process would be particularly useful for coating the inner bore of the planet gears.

The electron beam process imparts ample energy to sublime the substrate in a vacuum. The energy levels of the e-beam must be ~20–40 kilowatts per gun thus requiring nuclear x-ray shielding.

Plasma enhanced chemical vapor deposition is activated by means of electromagnetic energy which must be sufficient so that the gas or liquid separates into electrons, ions, and free radicals and other excited state species. The coating compound is vaporized and introduced into a vacuum chamber where it is subjected to an electronic discharge. The electromagnetic field causes electrons to be ejected, creating ions and initiating a chain reaction to generate more charged particles. The excited species of gas in the glowing plasma are attracted to the substrate surface. The excited and neutral species of the compound are deposited on the substrate surface and built up atom by atom until a continuous layer is formed. A thin film depositing plasma is formed in a chamber by introducing at least one gaseous precursor into a region having a controlled electrical field.

The process parameters that are usually controlled during plasma deposition include the internal pressure level, the electrical field characteristics, the composition of the gas, its flow rate into the plasma and the target-bearing spacing. Varying these parameters will vary the characteristics and properties of the resultant film. It is, of course, desired to control these plasma variables to produce a film coating having the desired film properties. As applied to the present invention, it would be desirable to adjust the parameters to result in a film coating having a uniform thickness and composition.

One method, disclosed by Felt et al. in U.S. Pat. No. 4,888,199, hereby incorporated by reference, involves a process of depositing a thin film onto a surface of a substrate with the use of a plasma, wherein the plasma optical emission is monitored, analyzed and the results used to automatically control the nature of the plasma in order to control the characteristics of the deposited thin film.

The frequencies typically used in chemical plasma depositions range from about 10 KHz to about 1 GHz, and pressures vary from about 0.00001 to about 50 torr. The power coupling can be capacitive, inductive or microwave.

Microwave plasma enhanced chemical vapor deposition uses microwave energy in addition to the above process. This creates a similar product as described above.

The preferred method of coating the bearing material into the gear bore is sputtering. The main advantage of the sputtering process is that it produces a finely dispersed, uniform mixture of material alloy elements. In addition, the sputtering process has been continuously improved and developed over the last 15 years in the electronic and biomedical fields. Recent testing has confirmed that sputtering produces coatings with uniform thickness and ideal microstructure for application to highly loaded planetary gear systems.

The Composition of the Bearing Material

The bearing material shall comprise two or more chemical elements. The principal component is preferably a metal with high thermal conductivity and suitable strength, hardness and melting point. The preferred metals for the principal component include copper, aluminum silver or mixtures. The secondary components are used to impart suitable anti-friction and wear-resistant properties to the exposed surface. The preferred metals for the secondary components include lead, tin, indium antimony or mixtures.

The bearing material is preferably a copper-lead alloy. Copper-lead alloys have been used extensively in the automotive and aircraft industries. These alloys have been used in steel-backed bearings. In general engineering, copper-lead alloys have found wide application as bearings and bushings. The hardness and compressive and tensile strengths of these alloys decrease as the lead content is increased. The preferred bearing material composition for the power gear application is a mixture of copper and lead, with a lead content between 20 and 30% by volume, preferably between 25 and 29% by volume.

The properties of these alloys are profoundly affected by the method of manufacture and by the size of the prior art section casts. They have good antiseizure characteristics and can be used with some success where lubrication is uncertain or intermittent. Although copper-lead bearings are used without special support in some systems, generally, these alloys are applied on a steel shell to form a bushing.

Since lead may segregate during slow cooling, tin, nickel, manganese and other elements are sometimes added to reduce segregation. These elements also increase the strength of the basic alloy.

Copper-lead alloys containing about 30% Pb and as much as 5% Ag have been used. Another type of bearing which has been used has an intermediate layer of 25% Pb copper-lead cast on a shell back and a thin plated overlay of lead-tin-copper alloy. These alloys have exceptionally high resistance to fatigue and are widely used in the automotive, diesel and aircraft fields.

The composition of the bearing material must be carefully optimized to achieve the desired characteristics for fatigue strength, heat transfers, lubricity and wear resistance. The higher the lead content of the copper-lead alloys, the lower the fatigue strength and higher the antifriction characteristics. Silver and tin may be substituted for part of the copper in order to increase fatigue strength.

The Bearing Coating

The coating should have a thickness of less than about 0.0040 inches. Preferably, the coating should have a thickness of about 0.0016 to 0.0040 inches, more preferably 0.0021 to 0.0037 inches, even more preferably 0.0026 to 0.0034 inches and most preferably 0.0030 to 0.0032 inches.

The resultant coating of bearing material should be substantially uniform composition and thickness, preferably with a variation in thickness of less than 15%, more preferably less than 10%, even more preferably less than 3%, and most preferably less than 1%.

The present invention is further described and illustrated in the following examples. It will be appreciated that these examples are provided solely for illustrating the invention and not for the purpose of limitation. It will further be appreciated that variations and modifications to the product and process can be made by the skilled person without departing from the spirit or scope of the invention as defined in the appended claims.

EXAMPLE 1

A sputtering process and a bearing coating material composition have been developed for direct application of a copper-lead coating to a planetary gear bore of diameter 90 mm. The process and the coating were first applied to a sub-scale bushing of diameter 75 mm. to simulate planetary gear operating conditions in a development test program. The coated bushing was tested on a material development rig which simulates the environment the material coating will be subjected to when incorporated into a planetary gear system. The purpose of the rig is to test the properties of the sputtered bearing material. The sputtering process was conducted in a vacuum typically involving temperatures as high as 570° F. The target materials used were combined rings of copper and lead mounted in the center of the gear or bushing bore. The sputtering rate was approximately 0.05 in$^3$/hr. Margin testing was employed in which the test program was designed to explore the operating limits of the sputtering process and the coating. Parametric ranges tested included lead content from 20 to 35%, thickness from 0.0016 to 0.0045 in., hardness from 110 to 160 MHV and surface finish from 10 to 50 micro inches.

During the test program, failures were deliberately induced by excessive load maldistributions or by severely reduced oil flows. The failures were detected either by the recording of excessive local temperatures of the bearing "pin" or shaft or by bearing seizure. Accelerated testing was performed with the bearing deliberately edge loaded, equally at each end. This was accomplished by appropriate selection of stiffness characteristics of the test rig housing and shaft support system. One unexpected result was that no failures occurred with zero misalignment and normal oil flow. Oil film thicknesses as low as 17 microinches were calculated at the ends of the bearing. Temperature limits were established during the test program by progressively increasing the severity of the operating conditions and measuring pin temperatures before the onset of failure. Pressure-velocity (PV) levels as high as 18 million psi ft/min and Sommerfeld numbers (S) as low as 0.0008 were attained. These were also unexpected results. These limits can be increased by optimization of the process and the bearing material composition.

Failures were induced with deliberately excessive load maldistribution. A typical test failure mode sequence was identified in which, under extreme conditions, lead depletion and microscopic wear occurred in the load zone, followed by lead smearing on part of the surface and flaking or chipping in lead-depleted areas, resulting in seizure.

Under normal operating conditions, measured wear of the sputtered bearing was essentially zero, within the magnitude of the surface roughness. The performance of refurbished bearings, chemically stripped and re-sputtered, was equal to that of new bearings under the same conditions.

EXAMPLE 2

A coated planet gear according to the present invention and a prior art gear were tested in a gear test rig. The rig simulates the environment the planet gears would be subjected to when integrated into a planetary gear system. Full-scale component testing confirmed that a lightweight sputtered planet gear performs at least as well as the conventional east bearing sleeved gear. This is an unexpected result given that the sputtered planet gear achieves this while at the same time reducing the weight of the system. Weight reductions of at least 25% are achievable since the sputtered planet gear is smaller than the sleeved planet gear, has a smaller gear pitch diameter and thus provides a smaller and therefore lighter gear system.

The full-scale gear bore was sputter coated in a vacuum at temperatures up to 570° F. The sputtering rate was approximately 0.05 in$^3$/hr. Component rig testing was conducted for both the conventional cast bearing sleeved gear and the sputtered gear at identical operating conditions. The success criteria was based on measurements of the journal bearing pin temperatures at normal and reduced oil flows. Results showed that specific oil flows could be reduced from levels of 0.20 to levels of 0.05 lb/min. per million lb. ft/min., without violating the temperature limits established in Example 1. The sputtered gear temperature was consistently lower than the conventional cast bearing sleeved gear temperature. In addition, oil supply temperature could be simultaneously increased by 20° F. This latter result reduces internal energy losses and directly increases the overall efficiency of the gear system.

As illustrated by the foregoing description and examples, the present invention has great application for the formulation of improved planet gears and planetary gear systems. The present invention provides a planet gear with a bearing coating having an integral one-piece construction for reduced weight and cost, increased load capacity and precision. The invention eliminates the risk of failure of any mechanical retention features, while at the same time achieving improved PV levels and Sommerfeld numbers.

The teams and expressions which have been employed are used as terms of description and not of limitations, and there is no intention in the use of such terms or expressions of excluding any equivalents of the features shown and described as portions thereof, its being recognized that various modifications are possible within the scope of the invention.

We claim:

1. A planetary gear assembly for high speed and heavy load, comprising:
   a ring gear;
   a sun gear disposed within said ring gear;
   a plurality of planet gears meshing with both said ring and sun gears, each said planet gear having an inner bore surface;
   each of said planet gears being supported in the assembly by a pin disposed therein, a planet carrier supporting each of said pins; and
   wherein a bearing material is applied directly to said inner bore surface of each of said planet gears and the bearing material forms a coating having a thickness between about 0.0016 to about 0.0040 in.

2. A planetary gear assembly as described in claim 1, wherein the bearing material comprises a mixture of the following:
   a. at least one element selected from the group consisting of copper, aluminum, silver and mixtures thereof; and
   b. at least one element selected from the group consisting of lead, tin, indium, antimony and mixtures thereof.

3. A planetary gear assembly as described in claim 1, wherein the bearing material comprises a mixture of copper and lead.

4. A planetary gear assembly as described in claim 1, wherein the bearing material comprises a mixture of copper and lead, with a lead content between 20 and 30% by volume.

5. A planetary gear assembly as described in claim 1, wherein the bearing material forms a coating having a thickness between about 0.0030 to about 0.0032 in.

6. A planetary gear assembly as described in claim 1, wherein the bearing material is applied by sputtering.

7. A planetary gear assembly as described in claim 1, wherein the bearing material is applied by vapor deposition.

8. A planetary gear assembly as described in claim 1, wherein said assembly comprises at least five planet gears.

9. A planetary gear assembly as described in claim 2, wherein the bearing material forms a coating having the thickness between about 0.0030 to about 0.0032 in.

10. A planetary gear assembly as described in claim 1, wherein the coating has a surface finish of about 10–50 microinches.

11. A planetary gear assembly as described in claim 1, wherein the hardness of the coating is about 120–170 Vickers.

12. A planetary gear assembly as described in claim 1, wherein the coating has a thickness between about 0.0026 to 0.0034 inches.

13. A planetary gear assembly as described in claim 2, wherein said coating is a finely dispersed, uniform mixture.

14. A planet gear comprising an outer surface and an inner bore surface, wherein the inner bore surface is coated with a bearing material and the bearing material forms a coating having a thickness between about 0.0016 to about 0.0040 in.

15. A planet gear as described in claim 14, wherein the bearing material comprises a mixture of the following:
   copper, aluminum, silver or mixtures thereof; and
   b. lead, tin, indium, antimony or mixtures thereof.

16. A planet gear as described in claim 14, wherein the bearing material comprises a mixture of copper and lead.

17. A planet gear as described in claim 14, wherein the bearing material comprises a mixture of copper and lead, with a lead content between 20 and 30% by volume.

18. A planet gear as described in claim 14, wherein the bearing material forms a coating having a thickness between about 0.0030 to about 0.0032 in.

19. A planet gear as described in claim 14, wherein the bearing material is supplied by sputtering.

20. A planet gear as described in claim 14, wherein the bearing material is applied by vapor deposition.

21. A planet gear as described in claim 14, wherein said coating has a surface finish of about 10–50 microinches.

22. A planet gear as described in claim 14, wherein the hardness of the coating is about 120–170 Vickers.

23. A planet gear as described in claim 14, wherein the coating has a thickness between about 0.0026 to 0.0034 inches.

24. A planet gear assembly as described in claim 15, wherein the bearing material comprises a mixture of copper and lead, with a lead content between about 25 and 29% by volume.

* * * * *